A. P. Jackson
Hominy Mach.
N° 91,343.    Patented Jun. 15, 1869.
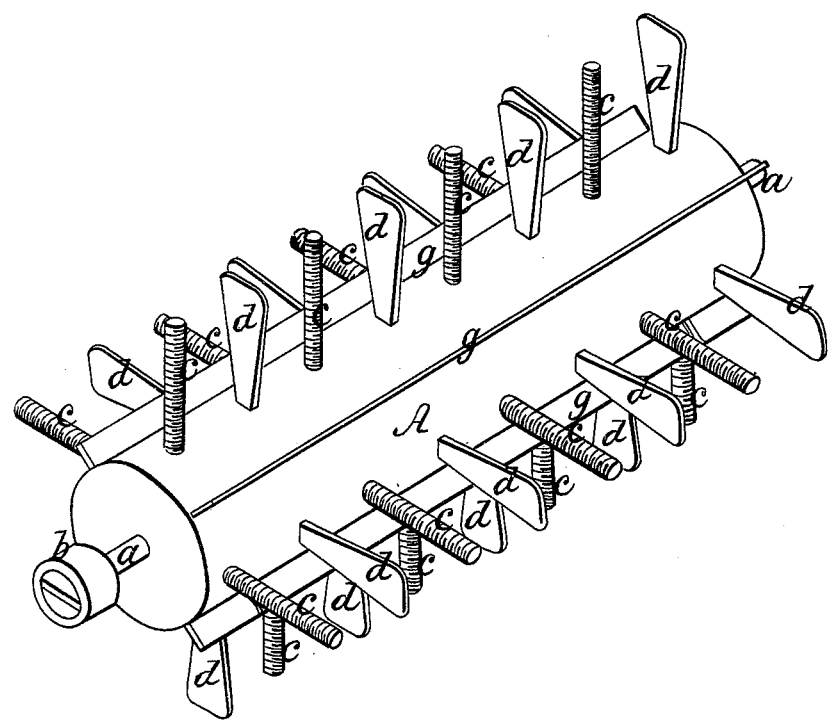
Witnesses;
Jno. A Ellis
A. F. Worth
Inventor;
Andrew P. Jackson
Per.
J. H. Alexander
Atty

ANDREW P. JACKSON, OF MEMPHIS, INDIANA.

Letters Patent No. 91,343, dated June 15, 1869.

IMPROVEMENT IN HOMINY-MILL BURRS.

The Schedule referred to in these Letters Patent and making part of the same.

*To whom it may concern:*

Be it known that I, ANDREW P. JACKSON, of Memphis, in the county of Clark, and State of Indiana, have invented certain new and useful Improvements in Hominy-Mill Burrs; and I do hereby declare that the following is a full, clear, and exact description thereof, reference being had to the accompanying drawings, and to the letters of reference marked thereon, which form a part of this specification, and in which is represented a perspective view of my improved burr for hominy-mills.

The nature of my invention consists in the employment of a cylindrical shaft, provided with rows of screws, knives, and fans, or blowers, arranged to operate substantially in the manner hereinafter set forth.

To enable others skilled in the art to which my invention appertains, to make and use the same, I will now describe its construction and operation.

In the accompanying drawings—

A represents a cylindrical shaft, through the centre of which is passed the metal rod $a$.

$b$ is a pulley, attached to the upper end of the rod $a$, for the purpose of operating the burr.

$c\ c\ c$ are screws or threaded bolts, placed around the shaft in a spiral shape, as seen in the drawing.

$d\ d\ d$ are knives, placed around the shaft between the screws.

$g\ g\ g$ are fans or blowers, made the same length of the shaft, and placed thereon between each row of combined screws and knives.

The object of these fans or blowers is to separate the meal and hulls from the grain.

A burr constructed with screws alone is found to be too tardy in its operation, while one made with knives alone reduces the grain too quick, that is, before it is thoroughly hulled.

By my improved burr the process is equalized, and an effective huller obtained.

Having thus described my invention,

What I claim as new, and desire to secure by Letters Patent, is—

The shaft A, in combination with the screws $c\ c\ c$, knives $d\ d\ d$, and fans $g\ g\ g$, all arranged to operate substantially in the manner and for the purpose described.

In testimony that I claim the foregoing as my own, I affix my signature, in presence of two witnesses.

ANDREW P. JACKSON.

Witnesses:
 J. D. COOMBS,
 WILLIAM HANCOCK.